Sept. 8, 1970   W. LEON   3,528,075
DEVICE FOR RAISING THE SEAT OF A CLOSET
Filed Jan. 25, 1968   4 Sheets-Sheet 4
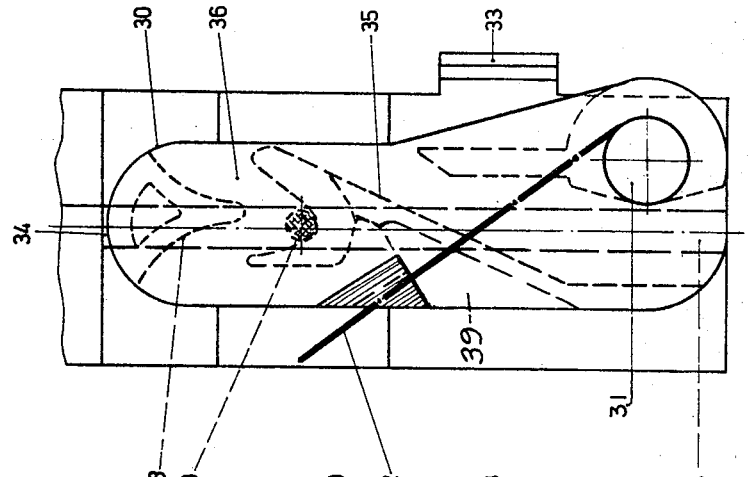
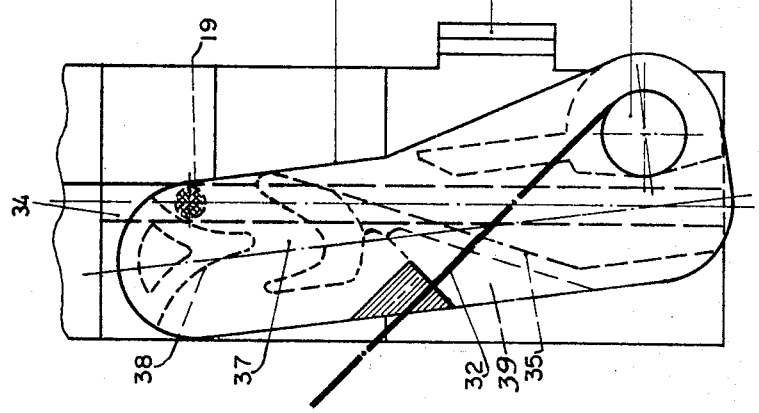
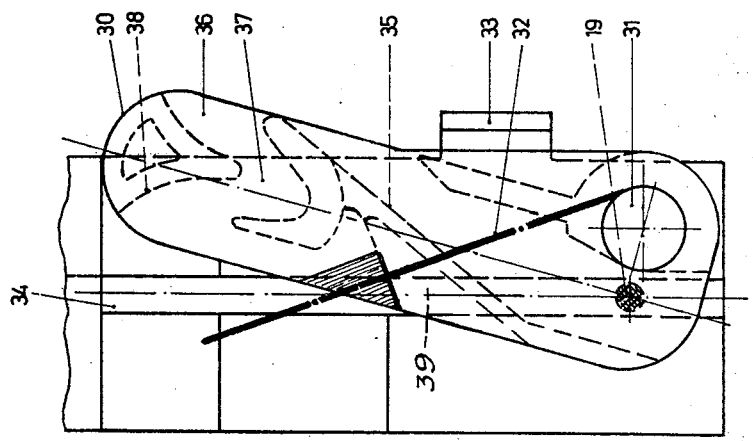

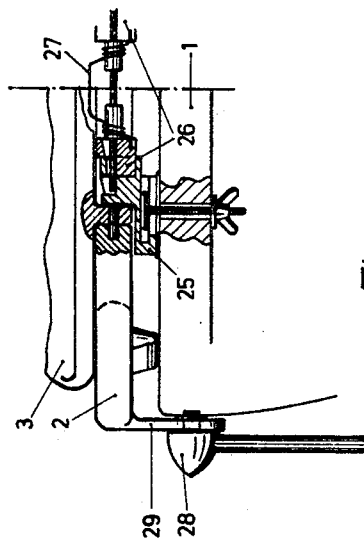
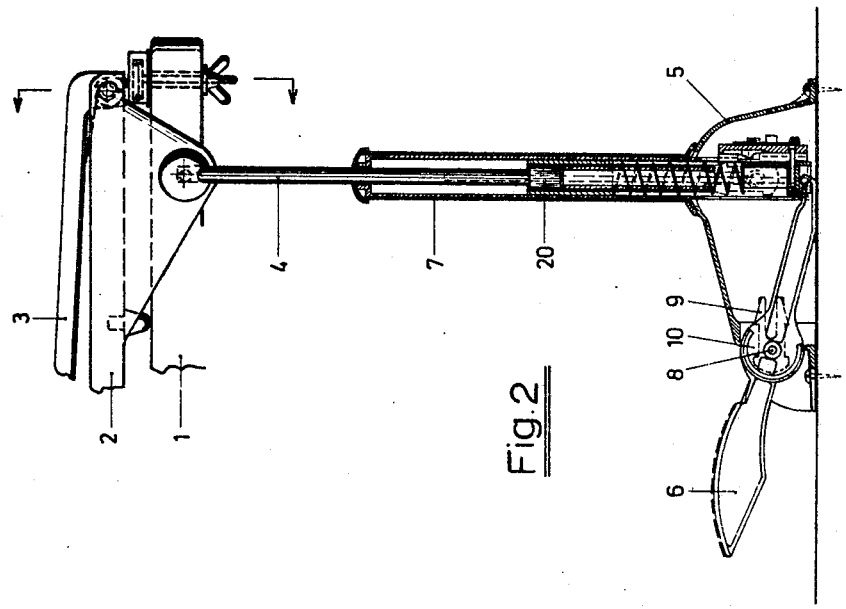

United States Patent Office 3,528,075
Patented Sept. 8, 1970

3,528,075
DEVICE FOR RAISING THE SEAT OF A CLOSET
Willi Leon, Heemstede, Netherlands, assignor of one-half to Lambert Johan Nicolaas Schutterop, Amsterdam, Netherlands
Filed Jan. 25, 1968, Ser. No. 700,455
Claims priority, application Netherlands, Jan. 30, 1967, 6701415
Int. Cl. A47k *13/10*
U.S. Cl. 4—251                              9 Claims

ABSTRACT OF THE DISCLOSURE

A device for raising the seat of a closet, wherein two pressure members which are coupled with each other by means of a spring member are slidably mounted in an upstanding guide member, the lower pressure member being adapted to be lifted by means of a pedal and locked in an upper position, the upper pressure member being connected to a control member which engages the seat.

BACKGROUND OF THE INVENTION

The invention relates to a device for raising the seat of a closet or toilet fixture.

It is an object of the invention to provide a device with which the seat of a closet may be raised without contacting this seat by hand, which of course is an advantage on hygienic grounds.

In principle, it would be possible to use a device of the type which is applied for raising the cover of a so-called pedal bin for the above purpose. However, such device is less suitable for raising the seat of a closet on several grounds. Firstly, such device makes it necessary to keep the foot on the pedal as long as the cover of the pedal bin has to remain in the raised position. This would be difficult when the device would be applied for raising the seat of a closet. Secondly, the cover of such pedal bin falls immediately down upon release of the pedal. If, however, a seat of a closet, which is considerably heavier than such cover, would be lowered in this way, the danger would exist that damage to the seat might occur.

The present invention provides a device which is fully adapted to the purpose in view.

SUMMARY OF THE INVENTION

According to the invention two pressure members which are coupled with each other by means of a spring member are slidably mounted in an upstanding guide member, the lower pressure member being adapted to be lifted by means of a pedal and locked in an upper position, the upper pressure member being connected to a control member which engages the seat.

As the lower pressure member is locked in the upper position the pedal may be released after the seat is raised while the seat will still remain in its raised position. Of course, in order to lower the seat again the lock should be released. If this would be forgotten, it would be possible that another person would try to lower the seat by hand. However, the application of the spring member prevents any damage of the mechanism in that case.

According to a preferred embodiment of the invention the guide member comprises a sleeve supporting two diametrically positioned horizontal studs near its lower end, said studs each being mounted in a bearing, so that the sleeve may pivot about a horizontal axis, said control member consisting of a rod which is rigidly connected to the upper pressure member and which is hinged to the seat.

If the pedal consists of a two-armed lever rotatable about a central horizontal axis in a manner known per se said sleeve may have a slot at its lower end directed perpendicular to the axis of rotation, said slot receiving the free end of said lever, so that the lever may engage the lower side of the lower pressure member.

According to an advantageous embodiment said rod and said upper pressure member are sealed with respect to the sleeve, so that the upward movement of the seat is retarded by a compression of the air present in the upper part of the sleeve.

The lower pressure member may be locked by means of a horizontal pin which passes through the slot in the sleeve and which cooperates with a spring-biased lock on the outer side of the sleeve.

For this purpose a flat lock may be applied, which cooperates with a torsion spring, said lock having a main plane extending perpendicular to said pin and comprising a guide surface cooperating with said pin and communicating with an inner recess via a bevelled downwardly directed notch, so that the pin upon attaining the uppermost position snaps into the notch, engages the upper wall thereof and stops the lower pressure member, while upon release of the pedal the pin comes to rest on the lower side of the recess and keeps the lower pressure member in the upward position.

A device wherein a simple release of the lower pressure member is obtained is characterized in that, upon renewed actuation of the pedal, the pin engages the upper side of the recess, whilst, upon release of the pedal, said pin engages a guide surface, which is bent outwardly out of the plane of the lock, so that the lock is displaced outwardly and the pin may pass said lock, the device returning to its initial position under the influence of the weight of the seat.

Preferably, said spring member consists of a helical spring mounted between said pressure members.

If apart from the seat a cover is applied, the latter will have to be raised simultaneously with the seat. It would be advantageous to construct the device in such manner, that, upon actuation of the pedal, the cover passes the dead center position i.e. the position beyond which it would return by gravity to its initial position when released, but the seat stops before the dead center position is reached. When the pedal of such construction is actuated again the seat will lower under the influence of its own weight but the cover will remain in the raised position.

This problem may be solved in two different manners.

According to a first embodiment, the cover cooperates with a spring connected to the seat hinges and tensioned by the weight of the cover, said spring maintaining the cover spaced from the seat, so that the cover in the lowered position spacedly floats above the seat, said spring being relieved when the seat is raised, so that the cover is pivoted past the dead center position.

In a second embodiment said rod is provided with an axial bore wherein a second actuating rod is slidably mounted, said second actuating rod being rigidly connected to the lower pressure member and effecting the raising of the cover.

BRIEF DESCRIPTION OF THE DRAWINGS

FIG. 2 shows a vertical section of the seat raising device.

FIG. 3 shows a rear view, partly broken away and in section, of the upper portion of the closet and of the bearing of the seat and of the cover.

FIGS. 5, 6 and 7 show different positions of the lock for locking the lower pressure member.

DESCRIPTION OF THE PREFERRED EMBODIMENTS

Figure 1:
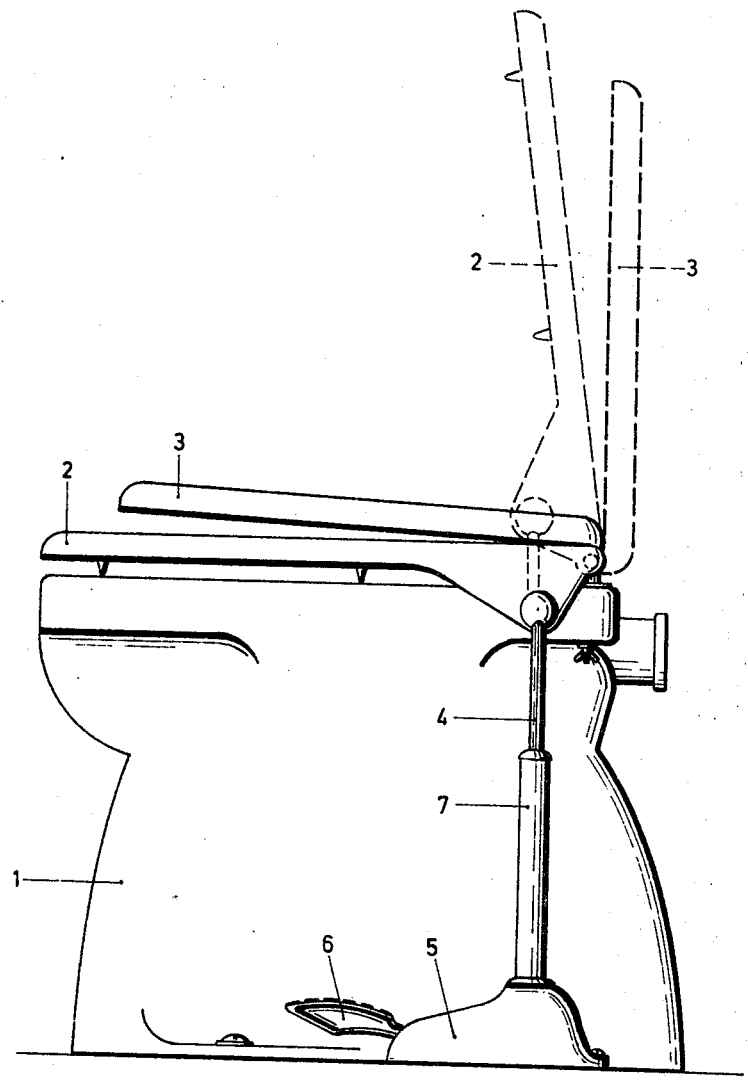
FIG. 1 shows a side view of a closet provided with a device for raising the seat.

FIG. 1 shows a toilet fixture or closet 1 provided with a seat 2 and a cover 3. Spring pressure is exerted on the cover 3 in its lowered position and maintains the cover and the seat spaced from each other, so that the cover seems to float above the seat. The seat 2 is hingedly connected to a rod 4. When this rod is lifted the seat 2 and the cover 3 are pivoted upwardly together, the set 2 stopping before its dead center position is reached, but the cover 3 passing its dead center position. The raised position of the seat and of the cover are shown in dash lines. A pedal housing 5 with a pedal 6 protruding therefrom is positioned at the right-hand side of the closet 1. Upon a first actuation of the pedal 6, the rod 4 is moved upwardly, so that the seat 2 is raised and is locked in its upper position. Upon a second actuation of the pedal 6 the seat is released and is lowered under the influence of its own weight. However, the cover maintains its raised position and may be lowered by hand, if desired. The coupling means between the pedal 6 and the rod 4 are mounted in a sleeve 7.

As shown in FIG. 2 the pedal 6 consists of a two-armed lever connected to a central horizontal cross shaft 8. This shaft 8 is journalled in two forked bearings 9 made of synthetic, elastic material. The pedal together with its bearings are inserted in the pedal housing from the left-hand side, during which operation the forked ends of the bearings are pressed together until two recesses in each bearing engage block-shaped protrusions 10 of the pedal housing, whereafter the bearings are locked.

The sleeve 7, which is substantially made of synthetic material may rotate about a horizontal axis and is journalled in the pedal housing 5 in the same manner as the pedal 6. For this purpose the sleeve 7 is provided on both sides with a stud 11 (FIG. 4), which is supported in a forked bearing 12 of elastic synthetic material, while recesses in each bearing 12 are in engagement with block-shaped protrusions of the pedal housing. The pedal housing has a large opening 13 at its upper side in order to enable the sleeve to pivot. This opening 13 is covered by a cap 14 connected to the sleeve. The part of the sleeve 7 beyond the pedal housing is provided with a metal covering 15. The lower part of the sleeve 7 is provided with a slot on both sides in order to enable the pedal 6 and the locking means to pass.

Two pressure members, viz. a lower pressure member 16 and an upper pressure member 17 are mounted in the sleeve 7. The lower pressure member 16, which is made of synthetic material has a substantial cylindrical shape, but is provided at the left-hand side (in FIG. 4) with a slot. The pressure member 16 comprises an intermediate bottom 18, which is an engagement with the free end of the pedal 6. Further, a locking or radially extending pin 19 is fitted in this intermediate bottom 18.

The upper pressure member 17 consists of a metal hollow cylinder. The rod 4 comprises an enlarged portion 20 which is screwed in the pressure member 17. Further, the pressure member 17 is provided with a covering 21 of synthetic material extending from its upper end to approximately half its height. A rotation of the pressure member 17 with respect to the sleeve 7 is prevented by a cam 22 on the pressure member 17, which is in engagement with a slot 23 in the sleeve 7.

The pressure member 16 and 17 are coupled together by means of a helical spring 24. This spring rests with its lower end on the pressure member 16 and engages the covering 21 of the pressure member 17 with its upper end.

When the pedal 6 is pressed downwardly by the foot of an operator, the pressure member 16 is lifted and locked in its upper position. During this upward movement of the pressure member 16, the spring 24 is brought under compression. During the following relief of the spring 24 the upper pressure member 17 together with the rod 4 are lifted, so that the seat 2 is raised. This movement of the seat 2 is retarded by the air present in the upper portion of the sleeve 7, which can escape only slowly. In this manner the advantage is obtained that the seat is uniformly raised independent of the force exerted on the pedal 6, so that damage of the mechanism due to rough treatment is effectively avoided. Upon a second actuation of the pedal, the lower pressure member 16 is released, whereafter the seat lowers again under the influence of its own weight.

As shown in FIG. 3 the seat 2 and the cover 3 are pivotally mounted on the closet 1 in the usual manner by means of hinges 25. The hinges 25 are each provided at the inner side with a hole having an oval cross section and receiving an oval projection of an insert 26, so that this insert is locked against rotation with respect to the hinge. A U-shaped spring 27 is mounted between the inserts 26, the ends of this spring being received in holes in the inserts. Both inserts are interconnected by a rod, which may be passed from the upper side via slots into the oval holes in the hinges 25. The web of the spring 27 presses against the cover and keeps the cover spaced from the seat. When the cover 3 is lowered the spring 27 is tensioned by the weight of the cover. Upon raising of the seat 2 the spring is relieved, so that the cover passes the dead center position, i.e. the position beyond which the cover would return by gravity to its initial position when released whereas the seat stops before the dead center position thereof is reached.

FIG. 3 further shows that a head 28 of synthetic, elastic material is screwed on the rod 4. This head 28 is provided with a pin which is passed through a hole in a lug 29 of the seat. The free end of this pin has a larger diameter than the hole in the lug, so that the pin snaps in the lug. In this manner the hinging connection between the rod and the seat is obtained.

If the seat is raised, the head 28 follows a circular path having the hinge 25 as its center which movement is possible due to the fact that the sleeve 7 is rotatable about a horizontal axis.

The locking operation is now described with reference to FIGS. 4–7.

For this locking operation a flat lock or locking member employed 30 which is rotatable about a shaft 31 and is urged clockwise (in FIGS. 5–7) by means of a spring 32, so that the lock normally rests against the stop 33. The lock 30 is positioned on the outer side of the sleeve 7 and cooperates via a slot 34 with the pin 19 connected to the lower pressure member. FIG. 5 shows the rest position of the device where in the pin 19 is positioned at the lower end of the slot 34. Upon actuation of the pedal 6 in order to raise the seat, the pin 19 moves upwardly through the slot 34 and engages a first guide surface 35 of the lock, so that the lock rotates to the left as shown in FIG. 6. The guide surface 35 communicates with an inner recess or substantially U-shaped guiding channel 37 via a bevelled downwardly directed notch 36. As soon as the pin 19 reaches the notch 36, the lock rotates to the right again, so that the pin 19 engages the upper side of the notch 36. In this manner the pressure member 16 is stopped and is prevented from further upward movement. Upon release of the pedal, the pin 19 comes to rest on the lower side of the recess 37 as shown in FIG. 7, so that the pressure member 16 is kept in its upward position and the seat is maintained in its raised position. The pedal 6 returns to its initial position by its own weight or by means of a return spring.

For lowering the seat, the pedal is again actuated, so that the pressure member 16 is lifted somewhat higher than the position shown in FIG. 7. Now the pin 19 engages the upper side 38 of the recess 37. Upon release of the pedal the pin 19 engages a second guide surface 39 which is outwardly out of the plane of the lock, so that the lock is pivoted outwardly. For this purpose the lock is journalled on the shaft 31 with some play. Due to this pivotal movement of the lock, the pin 19 may pass the lock, whereafter the pressure member 16 returns to its initial position. As the spring 24 is now relieved the pressure member 17 moves downwardly due to the weight of the seat. However, the movement of the seat is still somewhat retarded by the spring 24, so that the seat slowly returns to the horizontal position without any danger of damage.

Figures 4, 8:
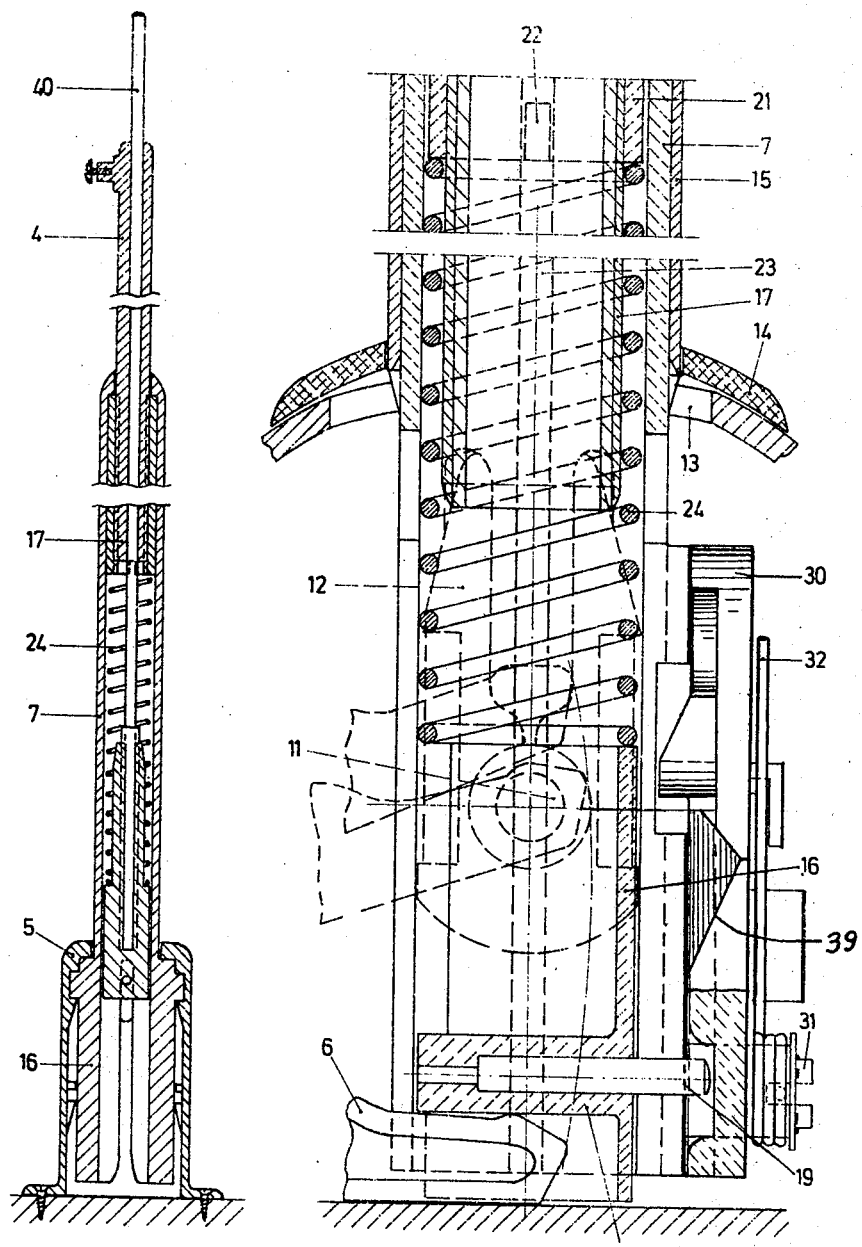
FIG. 4 shows a portion of the seat raising device in section and on a larger scale.
FIG. 8 shows a vertical section of a modification of the seat raising device according to FIGS. 1–7.

FIG. 8 shows a modification wherein the raising movement of the cover is effected in a different manner. In this embodiment the rod 4 is provided with an axial bore wherein a second actuation rod 40 is slidably mounted. This rod 40 is screwed in the lower pressure member 16 and effects the raising movement of the cover. When the pedal is actuated the rod 40 is lifted simultaneously with the lower pressure member, so that the cover is raised independently of the movement of the seat.

I claim:

1. A device for raising and lowering the seat of a toilet fixture, said device comprising an upstanding guiding sleeve, a lower and an upper pressure member both enclosed by said sleeve and independently slidable in the same, a compression spring enclosed in said sleeve and arranged between the said pressure members, a rod rigidly attached to said upper pressure member and hingedly conncted to the seat, so that the seat is raised upon upward movement of said upper pressure member, a pedal adapted to move said lower pressure member from a lower to an upper position, whereby said spring is compressed so that it may raise said upper pressure member, a catch mechanism locking said lower ressure member in its upper position, and means in said catch mechanism for releasing said lower pressure member upon renewed actuation of said pedal, whereby the seat is lowered.

2. A device as claimed in claim 1, further comprising a housing partially enclosing said pedal and surrounding the lower end of said sleeve, two horizontal diametrically opposed studs radially extending from said sleeve, and two diametrically opposed bearings in said housing each supporting one of the said studs, so that said sleeve is pivotable about a horizontal axis.

3. A device as claimed in claim 1, wherein said rod and said upper pressure member are sealed with respect to said sleeve, so that the upward movement of the seat is retarded by the compression of air in the upper portion of said sleeve.

4. A device as claimed in claim 1, further comprising a hinged cover for the seat, and a second rod attached to said cover in order to raise the same, slidable in an axial bore of said first-mentioned rod, and rigidly attached to said lower pressure member.

5. A device as claimed in claim 1, wherein said sleeve is provided at its lower end with a first and a second slot, diametrically opposed to each other and both parallel with the longitudinal axis of said sleeve.

6. A device as claimed in claim 5, wherein said pedal comprises a two-armed, rotatably supported lever, one arm of which engages the bottom of said lower pressure member upon depression of the other arm of said lever.

7. A device as claimed in claim 5, wherein said catch mechanism comprises a flat elongated locking member mounted on the outside of said sleeve adjacent said second slot, said locking member being rotatable about an axis perpendicular to the longitudinal axis of said sleeve, a second spring biasing said locking member in one direction of rotation, and a radially extending pin attached to said lower pressure member and cooperating with said locking member through said second slot, a cam on said upper pressure member being engaged in a third slot in said sleeve to prevent relative rotation between upper pressure member and said sleeve.

8. A device as claimed in claim 7, wherein said locking member has opposite longitudinal edges and is provided with a first guiding surface upwardly extending from about the middle of said locking member to one of its longitudinal edges, a substantially U-shaped guiding channel above said first guiding surface, connecting said longitudinal edge with the other longitudinal edge of said locking member, and a second guiding surface below said guiding channel and near said other longitudinal edge, which is inclined away from the plane of said locking member in downward direction, in such manner that said locking member is turned against the action of said second spring by engagement of said pin with said first guiding surface during a first actuation of said pedal, but turns back as soon as said pin reaches said guiding channel, whereby said pin is arrested by the top of the associated arm of said guiding channel and caught by the bottom of said guiding channel upon release of said pedal, and that said pin moves through the other arm of said guiding channel upon renewed actuation of said pedal so as to be arrested by the top of said other arm, and brought into engagement with said second guiding surface upon renewed release of said pedal, whereby said locking member is outwardly displaced so that said pin may pass.

9. A device as claimed in claim 1, wherein said catch mechanism comprises a flat elongated locking member pivotally mounted on said sleeve externally thereof, said sleeve having a longitudinal slot therein adjacent said locking member, a radial pin secured to said lower pressure member and slidable in said sleeve, said U-shaped guiding member having guiding surfaces and a locking channel arranged such that upon a first actuation of said pedal said pin rides in said slot in said sleeve and along said guiding surfaces to be received in said U-shaped guiding channel and held therein whereby the seat is held in raised position, whereas upon a second actuation of said pedal said pin is removed from said U-shaped guiding channel and passes along other guiding surfaces to descend to its original position while the seat is lowered.

References Cited

UNITED STATES PATENTS

| | | | |
|---|---|---|---|
| 1,529,656 | 3/1925 | Kornhauser | 4—251 |
| 1,863,295 | 6/1932 | Bukovitz | 4—251 |
| 2,092,707 | 9/1937 | Zulkoski | 4—251 |
| 2,100,906 | 11/1937 | Lefkowitz | 4—251 |
| 2,410,854 | 11/1946 | Zulkoski | 4—251 |
| 3,345,650 | 10/1967 | Waters | 4—251 |

FOREIGN PATENTS

| | | |
|---|---|---|
| 72,731 | 11/1959 | France. |
| 338,736 | 11/1930 | Great Britain. |
| 564,460 | 11/1932 | Germany. |
| 651,196 | 10/1937 | Germany. |
| 178,494 | 10/1935 | Switzerland. |

LAVERNE D. GEIGER, Primary Examiner

D. B. MASSENBERG, Assistant Examiner